US010002691B1

(12) United States Patent
Salz

(10) Patent No.: US 10,002,691 B1
(45) Date of Patent: Jun. 19, 2018

(54) HIGH-SPEED, HIGH RESOLUTION ETHERNET CABLE

(71) Applicant: David Salz, Davie, FL (US)

(72) Inventor: David Salz, Davie, FL (US)

(73) Assignee: WIREWORLD BY DAVID SALZ, INC, Davie, FL (US)

( * ) Notice: Subject to any disclaimer, the term of this patent is extended or adjusted under 35 U.S.C. 154(b) by 0 days. days.

(21) Appl. No.: 15/418,454

(22) Filed: Jan. 27, 2017

Related U.S. Application Data

(60) Provisional application No. 62/288,746, filed on Jan. 29, 2016.

(51) Int. Cl.

| | |
|---|---|
| ***H02G 3/00*** | (2006.01) |
| ***H01B 11/00*** | (2006.01) |
| ***H01B 1/02*** | (2006.01) |
| ***H01B 9/02*** | (2006.01) |
| ***H01B 7/18*** | (2006.01) |
| ***H01B 7/08*** | (2006.01) |

(52) U.S. Cl.
CPC ........... *H01B 11/002* (2013.01); *H01B 1/026* (2013.01); *H01B 7/0823* (2013.01); *H01B 7/1875* (2013.01); *H01B 9/021* (2013.01); *H01B 9/023* (2013.01)

(58) Field of Classification Search
CPC .... H01B 1/026; H01B 7/0208; H01B 7/0823; H01B 7/0838; H01B 7/0861; H01B 7/1875; H01B 9/02; H01B 9/021; H01B 9/023; H01B 11/002; H01B 11/04; H01B 11/203; H01B 11/1891; H01B 11/1895; H01R 12/675; H01R 12/775; H05K 9/0064
USPC .................................. 174/70 R, 350; 439/98
See application file for complete search history.

(56) References Cited

U.S. PATENT DOCUMENTS

| | | | | |
|---|---|---|---|---|
| 4,772,212 A * | 9/1988 | Sotolongo | ............ H01R 12/775 439/98 |
| 5,216,202 A * | 6/1993 | Yoshida | ................ H01B 7/182 174/106 R |
| 2007/0163800 A1* | 7/2007 | Clark | ..................... H01B 11/04 174/113 C |
| 2013/0333936 A1* | 12/2013 | Gundel | ................ H01B 7/0838 174/350 |

* cited by examiner

*Primary Examiner* — Timothy Thompson
*Assistant Examiner* — Guillermo Egoavil
(74) *Attorney, Agent, or Firm* — Malin Haley DiMaggio & Bowen, P.A.

(57) ABSTRACT

An improved Ethernet cable with an undulating and folding jacket housing external spatial channels. The undulating housing provides for multiple connection configurations from a flat cable to rectangular block configurations. The cable has a plurality of internal electronic signal channels, each channel having a pair of conductors. Each channel is also further isolated by a multi-layer protective shield, the protective shield encasing the pair of conductors. This unique design meets the new requirements of CAT8 cables, and substantially enhances video and audio streaming and transmission speeds, while eliminating deleterious effects of prior cables.

4 Claims, 3 Drawing Sheets

HIGH-SPEED, HIGH RESOLUTION ETHERNET CABLE

CROSS REFERENCE TO RELATED APPLICATIONS

This application claims priority from the Provisional Application Ser. No. 62/288,746, filed on Jan. 29, 2016.

STATEMENT REGARDING FEDERALLY SPONSORED RESEARCH OR DEVELOPMENT

N/A

BACKGROUND OF THE INVENTION

1. Field of the Invention

The present invention relates to cables for transmitting electrical signals or power. The signals may be either analog or digital in nature. In particular, the present invention relates to insulated high speed, high resolution multi-media Ethernet cables incorporating triple shielded twin axial conductors in an undulating flat structure, supporting 40 Gbps data transmission in addition to improved stability, flexibility and ease of assembly.

2. Description of the Prior Art

Category 8 performance is difficult to achieve with conventional shielded twisted pair Ethernet cables. The primary challenge is minimizing crosstalk (mixing) between the four signal channels. To control crosstalk, conventional Ethernet cables use four individually twisted pairs of conductors and some also include a metallized polyester shield on each pair. An overall shield may also be used to reduce outside interference. Twisting the conductors reduces crosstalk, but it also tends to make the conductor lengths uneven, which causes timing errors referred to in the industry as skew.

The assembly procedure for twisted pair Ethernet cables involves untwisting the conductors and feeding them individually into the appropriate slots within the connector. If there is a foil shield on the conductors, it will open up at the end of the twist. Therefore the twisting and the shield, which are required to control crosstalk, will end somewhat short of the point where the conductors enter the termination slots. The loss of this shielding and twisting within the connector increases the crosstalk of the cable.

The conductors of the instant invention are not twisted at all. Instead they are arranged as four (4) parallel channels with a dense three-layer shield on each conductor pair. These shields isolate the four channels so effectively that twisting is not required and conductor length differences are eliminated, thereby minimizing both crosstalk and skew. Moreover, since the inventive conductors may be arranged to specifically align with the termination slots, assembly is simplified and the shields can extend all the way to the termination slots, thus minimizing crosstalk.

The specific structure of the triple shields is an essential element of this invention. The reference standard for shielding effectiveness is a solid copper tube, which provides 100% coverage and maintains low shield transfer impedance up to the highest frequencies. The configuration of the three shield layers in the instant invention are optimized to emulate the performance of a solid copper tube. The innermost layer is a metallized polyester tape applied lengthwise with the metal side facing outward. This tape provides 100% coverage with moderate transfer impedance that is maintained up to the highest frequencies because it runs parallel with the conductors. The second layer consists of copper strands that are spiral wound at an angle of approximately thirty (30) degrees. This single layer of strands wound at a low angle minimizes resistance and inductance, which dramatically reduces the broadband transfer impedance of the first layer while preserving flexibility. The third layer is a metallized polyester tape that is spiral wound with the metal side facing inward. It is wound at an angle of approximately sixty (60) degrees to optimally compress and stabilize the first two layers and the conductors. In addition to minimizing crosstalk and external interference, this shield structure excels at maintaining its dimensions when the cable is flexed, thereby minimizing deleterious variations in the transmission properties of the cable.

The cable also allows for multiple configurations provided by “folding options” that accommodate the requirements of various plugs, connectors and equipment.

It is therefore an objective of the present invention to provide an improved high-speed, high-resolution Ethernet cable capable of enhanced transmission speeds, reproduction of streamed audio and video, as well as overall electronic performance and characteristics.

It is yet another objective of the present invention to provide an improved high-speed, high-resolution Ethernet cable meeting the new requirements of Category 8 cables.

It is yet another objective of the present invention to provide an improved high-speed, high-resolution Ethernet cable which overcomes the deficiencies of twisted pair conductors used in conventional Ethernet cables, including deleterious cross-talk and timing errors between channels.

It is yet another objective of the present invention to provide an improved high-speed, high-resolution Ethernet cable which allows for multiple configurations to accommodate the requirements of various plugs, connectors, and equipment.

Finally, it is an objective of the present invention to provide to provide improved high-speed, high-resolution Ethernet cables which are cost effective and operationally efficient while incorporating all of the above mentioned objects and features.

SUMMARY OF THE INVENTION

The inventive cable designs disclosed herein utilize novel conductor geometry for enhanced transmission speeds, and substantially improved reproduction of streamed video and audio. The unique Ethernet cable designs meet new CAT8 requirements, and incorporate twelve (12) tightly spaced shields isolating the four (4) channels within the cable. Each conductor pair is encased in discrete three (3) layer shields, so effective that twisted pair conductors are eliminated. The cables flat design defines an undulating external housing or jacket and incorporates separate external spatial channels forming crevices therein. The housing design allows for novel multiple configurations, such that the cable can be “folded” about itself to accommodate different connector, jack, and/or interfacing equipment.

BRIEF DESCRIPTION OF THE DRAWINGS

The invention may be better understood by reference to the drawings in which.

DETAILED DESCRIPTION OF PREFERRED EMBODIMENTS

Figure 1:
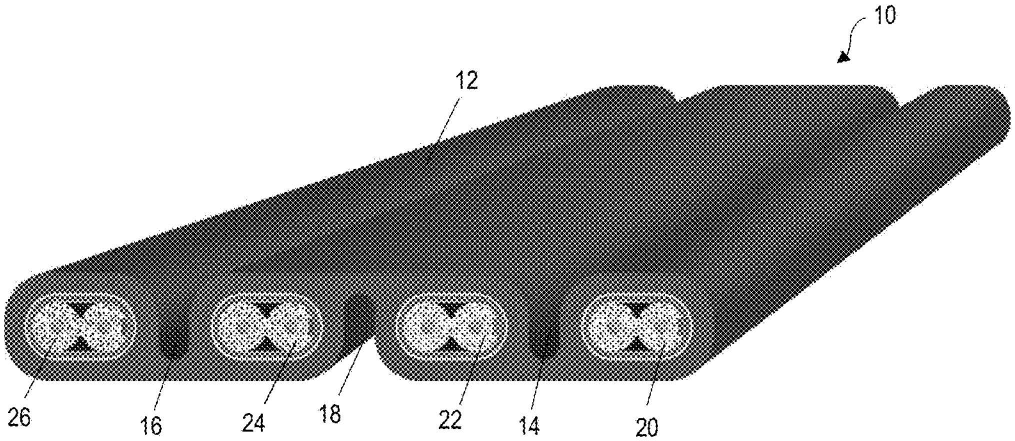
FIG. 1 illustrates a perspective cross-sectional view of an embodiment of the invention in a flat cable configuration.

Referring now to FIG. 1, the inventive Ethernet cable 10 is shown in a perspective cross-sectional view. The undulating housing or jacket 12 is illustrated, and incorporates upper spatial channels or crevices 14 and 16, as well as lower spatial channel or crevice 18, which allow for multiple configurations of the cable, as well as separating discrete internal electronic signal channel members, as will be described hereinafter.

Applicant's Ethernet cable includes four isolated internal electrical signal channels 20, 22, 24 and 26, each having a pair of conductors lying parallel in a plane when the cable is in a flat configuration. These components will be described in detail with respect to FIG. 2.

Figure 2:
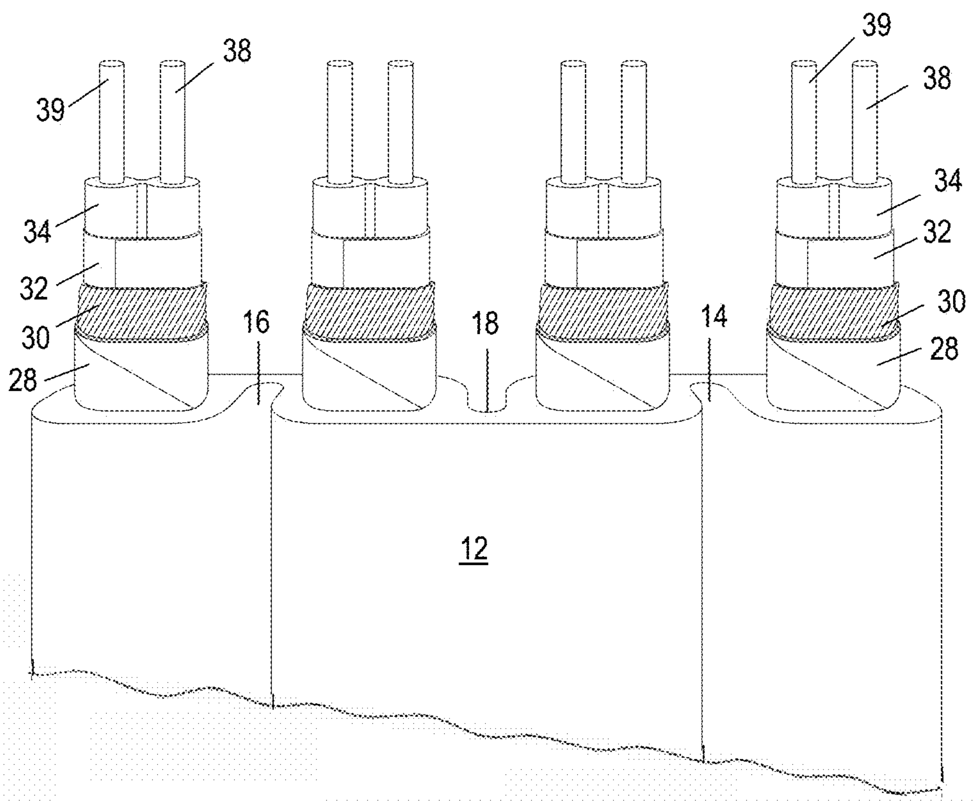
FIG. 2 illustrates a partial perspective cross-sectional view of the invention depicted in FIG. 1, with cut-away views of the detailed cable components.

Referring now to FIG. 2, each signal channel has a pair of conductors 38 and 39, which can have individual or duplex insulating extrusions 34. Each channel pair of conductors are isolated by discrete three (3) layer shields 32, 30 and 28. The separate multi-layer shield designs produces substantially diminished crosstalk, enables higher transmission speeds and eliminates the need for twisted pair conductors.

As discussed above, each channel pair includes the innermost layer of metallized polyester tape 32, the second layer of copper strands 30 being spiral wound at approximately thirty (30) degrees in relation to the conductors, and the third layer of metallized polyester tape 28 being spiral wound at approximately sixty (60) degrees in relation to the conductors. Layer 32 is applied lengthwise with the metal side facing outward, and layer 28 is applied with the metal side facing inward.

Figures 3A, 3B, 3C:
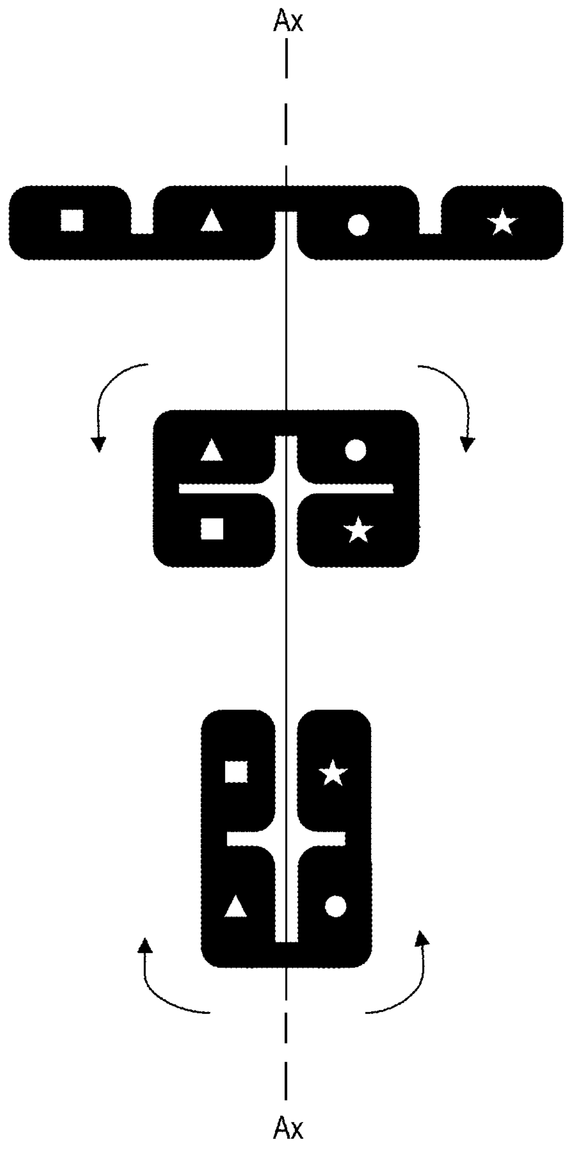
FIG. 3A is a cross-sectional view of an embodiment of the invention in a flat cable configuration.
FIG. 3B is a cross-sectional view of an embodiment of the invention in a folded cable configuration.
FIG. 3C is a cross-sectional view of an embodiment of the invention in an alternative folded cable configuration.

FIG. 3A represents a cross-sectional view of the inventive cable in a flat configuration, depicting the undulating jacket and channel members described in FIGS. 1 and 2.

FIG. 3B represents the cable shown in FIG. 3A when folded or rotated downwardly to achieve the particular rectangular block configuration shown.

FIG. 3C represents the cable shown in FIG. 3A when folded or rotated upwardly to achieve the alternative rectangular block configuration shown, and as distinguished from the configuration shown in FIG. 3B.

Also shown in FIGS. 3A, 3B, and 3C, is the axis Ax-Ax of rotation of the inventive cable, for the various rotation configurations described above.

Applicant's cable designs allow for the multiple configurations described, which accommodate multiple connection patterns to various connectors, jacks and equipment interfacing and related environments. High flexibility is provided to facilitate the best configurations, demands and practical applications of the end-user. The folding options provide a pragmatic solution to flexibility, crosstalk and length/skew issues, and further provide improved alignment of the conductors with plug contacts as will be appreciated by one skilled in this industry.

The above inventions have been described and illustrated with the reference structure, components and functions. Modifications and variations thereof will occur to those of ordinary skill in the art, and it is intended such modifications and variations will be within the scope of the inventive subject matter.

What is claimed is:

1. An improved Ethernet cable comprising:

an undulating housing having external spatial channel members, said undulating housing providing for multiple configurations;

said undulating housing being foldable from a flat configuration to multiple block configurations;

said undulating housing having upper and lower spatial channel members or crevices alternating on opposite sides of said housing;

said undulating housing having a plurality of internal electronic signal channel members, each said signal channel member having a pair of conductors;

said undulating housing providing for separation of said signal channel members; and each said signal channel member being isolated by a multi-layer protective shield, said multi-layer protective shield encasing said pair of conductors.

2. The improved Ethernet cable of claim 1, further comprising:

said undulating housing having four internal electronic signal channel members.

3. The improved Ethernet cable of claim 1, further comprising:

each said signal channel member being isolated by a three-layer protective shield, said three-layer protective shield encasing said pair of conductors.

4. The improved Ethernet cable of claim 3, further comprising:

said conductors being untwisted; and said three-layer protective shield includes a first layer of metallized polyester tape, a second layer of copper strands being spiral wound, and a third layer of metallized polyester tape being spiral wound.

* * * * *